United States Patent [19]
Bombled

[11] Patent Number: 4,852,681
[45] Date of Patent: Aug. 1, 1989

[54] DEVICE FOR PREVENTING THE THEFT OF MOTOR VEHICLES

[75] Inventor: Jean Bombled, Montesson, France

[73] Assignee: Neiman, Courbevoie, France

[21] Appl. No.: 215,601

[22] Filed: Jul. 6, 1988

[30] Foreign Application Priority Data

Jul. 9, 1987 [FR] France ............... 87 09722

[51] Int. Cl.[4] .................. B60R 25/00; B60R 25/04
[52] U.S. Cl. .................. 180/287; 340/428; 307/10.2
[58] Field of Search ............ 180/287; 307/10 AT; 340/63, 64

[56] References Cited

U.S. PATENT DOCUMENTS

| | | | |
|---|---|---|---|
| 4,485,887 | 12/1984 | Morano | 180/287 |
| 4,533,016 | 8/1985 | Betton | 180/287 |
| 4,672,225 | 6/1987 | Hanisko | 180/287 |
| 4,682,062 | 7/1987 | Weinberger | 180/287 |
| 4,733,638 | 3/1988 | Anderson | 180/287 |

FOREIGN PATENT DOCUMENTS 2608112  6/1988  France.

Primary Examiner—Richard A. Bertsch
Attorney, Agent, or Firm—Dowell & Dowell

[57] ABSTRACT

An anti-theft device for motor vehicles which operates by cutting off the electrical supply to the ignition by a relay supplied by a central electronic unit which is connected in series with the "on" contact of the anti-theft steering lock of the vehicle characterized in that the relay is connected to the central unit through at least one transistor and to ground by a switch device which is maintained open while the engine is running.

3 Claims, 1 Drawing Sheet

DEVICE FOR PREVENTING THE THEFT OF MOTOR VEHICLES

BACKGROUND TO THE INVENTION

The invention relates to an anti-theft device for motor vehicles which operates by cutting off the supply to the ignition.

STATEMENT OF PRIOR ART

Known anti-theft devices which act by cutting off the ignition generally offer considerable risk to the user or entail prohibitive electrical consumption when the device is in the monitoring mode.

In the event of the anti-theft device comprising a relay for earthing the coil, this relay may change condition due to shock and vibrations while the vehicle is moving. To offset this disadvantage, it has been proposed (French Pat. No. 2,608,112 to use a second contact in series with the ignition inhibiting contact of the coil, which is maintained open while the vehicle is being normally used.

In the case of an electronic ignition system or a transistorised ignition device, such earthing means have become useless due to the risk of destruction of the components by carryingg out such an operation.

Numerous anti-theft devices are now available with a relay operated by the central unit of the device and of which the contact is in series with the cut-out switch of the "on" contact of the anti-theft steering system.

Two types of assembly are the most frequently used. In a first type, the relay is supplied only while the anti-theft device is in the monitoring mode, the circuit then being cut to the supply to the coil. On the other hand, while the vehicle is moving, the relay has to remain constantly live which offers risk should the coil of the relay or its supply wire become faulty. In a second case of anti-theft device, the relay is not supplied with current while the vehicle is moving and so this risk is eliminated. On the other hand, when the alarm is set, the relay is live and therefore consumption is considerable.

OBJECT OF THE INVENTION

The present invention sets out to alleviate these disadvantages of the prior art anti-theft devices, by offering a new anti-theft device in which the supply cut-out relay is not permanently supplied but is supplied only on condition that the anti-theft device is in the monitoring mode, the engine of the vehicle is stopped and an attempt at theft has materialised by closure of the "on" contact of the cut-out switch of the anti-theft steering.

SUMMARY OF THE INVENTION

According to the invention there is provided an anti-theft device for motor vehicles which operates by cutting out the supply to the ignition by means of a relay supplied from a central electronic unit of which the contact is in series with the "on" contact of the vehicle's anti-theft device which operates on the steering, characterised in that the relay is supplied by central unit through at least one transistor, the relay being connected to earth by a switch device maintained open while the engine is running.

Advantageously, the trsansistor is earthed or grounded through the switch device.

In a preferred embodiment, the relay is supplied by the central unit through two transistors mounted in a cascade arrangement.

BRIEF DESCRIPTION OF DRAWINGS

The invention will be more clearly understood from reading the ensuing description which refers to the appended drawing in which.

DESCRIPTION OF PREFERRED EMBODIMENT

The anti-theft device described comprises a relay $R_L$ supplied by a central electronic control unit C and of which the contact $S_R$ is in series with the "on" contact M of the vehicle's cut-out switch anti-theft steering device. The output S of the contact $S_R$ supplies the ignition coil or an ignition computer (neither of which is shown).

Figure 2:
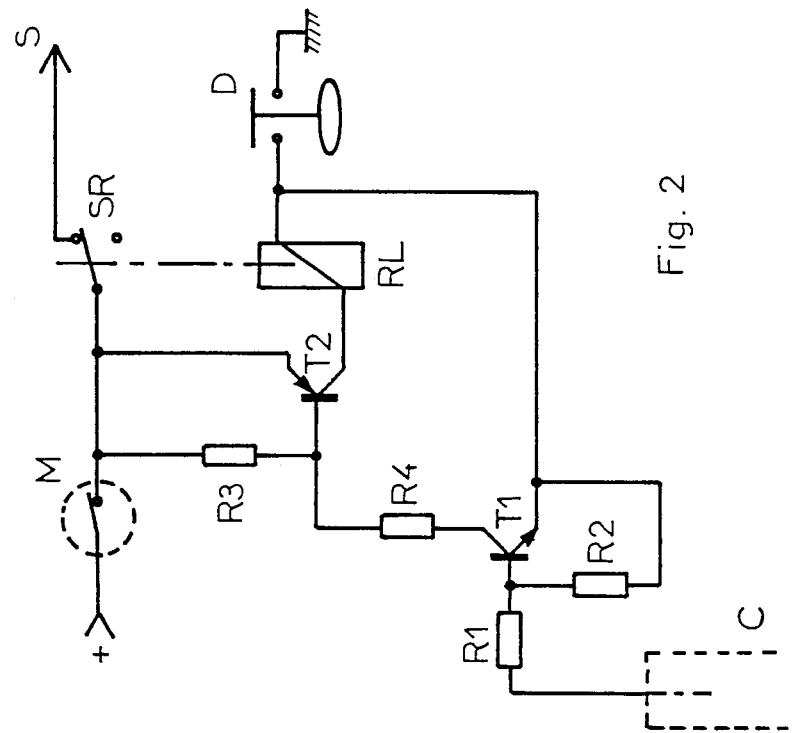
FIG. 2 is similar to FIG. 1, the central unit being switched off while the vehicle is running.

In accordance with the invention, the relay $R_L$ is supplied by the central unit C through a transistor $T_1$ and is connected to earth by a contacting device D maintained open (FIG. 2) while the engine is running. This contactor device D may for example be the oil pressure contact which exists on the vehicle.

In the example illustrated, the transistor $T_1$ is associated with a transistor $T_2$ mounted in cascade, in order to limit current intensities, with resistiors $R_1$, $R_2$, $R_3$, $R_4$. Furthermore, the collector of the transistor $T_1$ is connected directly to the contacting device D so that the transistor $T_1$ is not conductive when this contact D is open.

Figure 1:
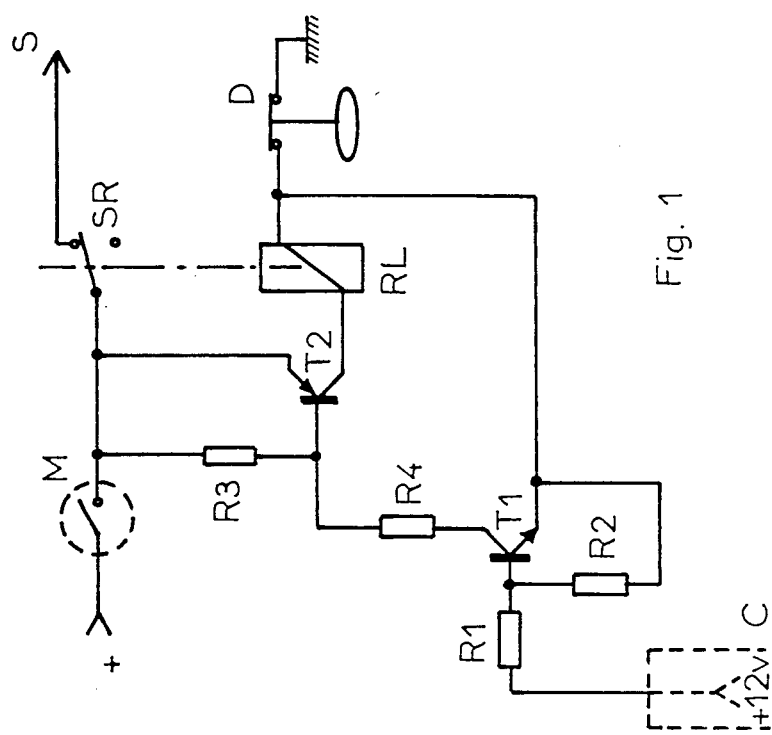
FIG. 1 is a circuit diagram of an anti-theft device according to one embodiment of the invention, the central unit being in the monitoring mode.

In the monitoring mode, the central unit C positively polarises the base of the transistor $T_1$ which then becomes conductive, which negatively polarises the base of the transistor $T_2$ which is therefore also in conductive state but does not supply the relay $R_L$, because the contact M of the anti-theft device is broken (see FIG. 1).

If an attempt is made to start up under these conditions, by closing or shunting the anti-theft contact M, the relay $R_L$ is immediately supplied through the transistor $T_2$ which breaks the contact $S_R$ so that the supply to the coil or the ignition computer will prevent the vehicle being started.

When the central unit C is shut down and the vehicle is operating (FIG. 2), there is a two-fold security. On the one hand, the central unit C no longer polarises the base of the transistor $T_1$; therefore, the transistors $T_1$ and $T_2$ are blocked and $R_L$ is not being supplied. Furthermore, as the contact D is opened, the relay $R_L$ is no longer linked to earth; therefore, even if there is a failure due to short circuiting of the transistors $T_1$ or $T_2$, the relay $R_L$ will not be called upon and the contact $S_R$ will remain in its position of rest.

I claim:

1. In an anti-theft device for motor vehicles operating by cutting off the electrical supply to the engine ignition circuit by means of a relay which is movable from a first closed position to a second open position when energized by a control circuit including a central electronic unit which is connected in series with the "on" contact of the vehicle's anti-theft steering switch when in a monitoring mode, the improvement of (a) at least one transistor connected between the relay and the central unit through which transistor the central unit can energize the relay when in a monitoring mode and the "on" contact of the anti-theft steering switch is closed, (b) a switch device for grounding the relay when the engine is not running, and (c) said switch device being open from ground while the engine is running.

2. The anti-theft device of claim 1, wherein said transistor is connected to ground through said switch device.

3. The anti-theft device of claim 1, wherein a second transistor is provided mounted in a cascade with said first transistor, through which the relay is energized by the central unit.

* * * * *